(12) United States Patent
Wada

(10) Patent No.: US 9,649,568 B2
(45) Date of Patent: May 16, 2017

(54) GAME SYSTEM FOR CHANGING A DIFFICULTY LEVEL OF A GAME

(75) Inventor: Yoichi Wada, Tokyo (JP)

(73) Assignee: KABUSHIKI KAISHA SQUARE ENIX, Tokyo (JP)

( * ) Notice: Subject to any disclaimer, the term of this patent is extended or adjusted under 35 U.S.C. 154(b) by 0 days.

(21) Appl. No.: 13/483,374

(22) Filed: May 30, 2012

(65) Prior Publication Data

US 2013/0165233 A1 Jun. 27, 2013

(30) Foreign Application Priority Data

Dec. 27, 2011 (JP) .................................. 2011-286122
Feb. 10, 2012 (JP) .................................. 2012-27624

(51) Int. Cl.
*A63F 9/24* (2006.01)
*A63F 13/85* (2014.01)
(Continued)

(52) U.S. Cl.
CPC .............. *A63F 13/85* (2014.09); *A63F 13/35* (2014.09); *A63F 13/792* (2014.09);
(Continued)

(58) Field of Classification Search
CPC ................ A63F 2300/807; A63F 13/67; A63F 2300/6027; G07F 17/32
(Continued)

(56) References Cited

U.S. PATENT DOCUMENTS 5,683,082 A * 11/1997 Takemoto ............... G07F 17/32
273/121 B
8,012,007 B2 9/2011 Yoshida
(Continued)

FOREIGN PATENT DOCUMENTS

CN 101229433 7/2008
CN 102024293 4/2011
(Continued)

OTHER PUBLICATIONS

Dungeon Level. Nethack.wikia.com. Online. Feb. 6, 2009. Accessed via the Internet. Accessed Nov. 1, 2014. <URL:http://wayback.archive.org/web/20090206163948/http://nethack.wikia.com/wiki/Dungeon_level>.*
(Continued)

*Primary Examiner* — Dmitry Suhol
*Assistant Examiner* — Carl V Larsen
(74) *Attorney, Agent, or Firm* — Greenblum & Bernstein, P.L.C.

(57) ABSTRACT

An object of the present invention is to provide a high-preference game system that can reduce a game development burden of a game system operator, can increase the desire of a player to iteratively play a game, and enables a player to play a game without aversion.
When a player requests a game open in a dungeon, 5 points among the points retained by the player is consumed, and 3 points are temporarily pooled in the dungeon. When the player succeeds in satisfying a clear condition of the dungeon, a total of 13 temporarily-pooled and not pooled points is added to a retention point of the player. Also, when the player fails to satisfy the clear condition of the dungeon, the temporarily pooled points are pooled in the dungeon.

20 Claims, 11 Drawing Sheets

(51) Int. Cl.
*A63F 13/35* (2014.01)
*A63F 13/792* (2014.01)

(52) U.S. Cl.
CPC . *A63F 2300/558* (2013.01); *A63F 2300/5513* (2013.01); *A63F 2300/5533* (2013.01); *A63F 2300/575* (2013.01); *A63F 2300/6027* (2013.01); *A63F 2300/61* (2013.01)

(58) Field of Classification Search
USPC .......................................... 463/1, 25, 42, 27
See application file for complete search history.

(56) References Cited

U.S. PATENT DOCUMENTS

| | | | |
|---|---|---|---|
| 2003/0211890 A1* | 11/2003 | Gendo | A63F 13/10 463/43 |
| 2005/0191605 A1* | 9/2005 | Nguyen et al. | 434/188 |
| 2005/0192087 A1* | 9/2005 | Friedman et al. | 463/25 |
| 2007/0066403 A1* | 3/2007 | Conkwright | A63F 13/10 463/43 |
| 2007/0099685 A1* | 5/2007 | Van Luchene | A63F 13/12 463/1 |
| 2007/0112706 A1* | 5/2007 | Herbrich et al. | 706/21 |
| 2007/0243925 A1 | 10/2007 | LeMay et al. | |
| 2007/0265050 A1* | 11/2007 | Baazov | 463/13 |
| 2007/0281775 A1* | 12/2007 | Kashima | 463/20 |
| 2008/0113816 A1* | 5/2008 | Mahaffey et al. | 463/42 |
| 2008/0161080 A1* | 7/2008 | Terasaki et al. | 463/9 |
| 2008/0161105 A1* | 7/2008 | Mishra | 463/27 |
| 2008/0194310 A1 | 8/2008 | Yoshizawa | |
| 2008/0214285 A1* | 9/2008 | Guyer et al. | 463/22 |
| 2009/0005172 A1 | 1/2009 | Shibahara et al. | |
| 2009/0270168 A1* | 10/2009 | Englman et al. | 463/27 |
| 2010/0072699 A1* | 3/2010 | Bress et al. | 273/121 A |
| 2010/0076842 A1* | 3/2010 | Berlec | 705/14.49 |
| 2010/0197389 A1* | 8/2010 | Ueda | 463/30 |
| 2011/0053672 A1* | 3/2011 | Gagner et al. | 463/16 |
| 2011/0053673 A1* | 3/2011 | Hardy | G07F 17/3239 463/17 |
| 2011/0312407 A1* | 12/2011 | Sakurai et al. | 463/23 |
| 2015/0105130 A1* | 4/2015 | McGrath | G07F 17/326 463/9 |

FOREIGN PATENT DOCUMENTS

| | | |
|---|---|---|
| JP | 10-85456 | 4/1998 |
| JP | 2002-018118 | 1/2002 |
| JP | 2003-340161 | 12/2003 |
| JP | 2007-301050 | 11/2007 |
| JP | 2009-009510 | 1/2009 |
| JP | 2009-533137 | 9/2009 |
| JP | 2011-242843 | 12/2011 |

OTHER PUBLICATIONS

Monopoly/House Rules. www.wikibooks.com. Online. Feb. 18, 2010. Accessed via the Interent. Accessed May 29, 2015. <URL: http://wayback.archive.org/web/20100218144110/http://en.wikibooks.org/wiki/Monopoly/House_Rules>.*

Office Action from Japan Patent Office (JPO) in Japanese Patent Appl. No. 2014-043346, dated Apr. 12, 2016, together with a partial English language translation.

Office Action from State Intellectual Property Office (SIPO) of the People's Republic of China in Chinese Patent Application No. 201210519729.0, dated Aug. 29, 2016, together with a partial English language translation.

Office Action from Japan Patent Office (JPO) in Japanese Patent Application No. 2012-027624, dated Sep. 10, 2013, together with an English language translation thereof.

Office Action from Japan Patent Office (JPO) in Japanese Patent Appl. No. 2014-43346, dated Nov. 15, 2016, together with a partial English language translation.

* cited by examiner

FIG. 5

| PLAYER ID | RETENTION POINT |
|---|---|
| ID1001 | 382 |
| ID1002 | 19 |
| ⋮ | ⋮ |

| DUNGEON ID | POOL POINT | TEMPORARY POOL POINT | PLAYER MANAGEMENT FLAG |
|---|---|---|---|
| ID2001 | 30 | 3 | 1 |
| ID2002 | 15 | 6 | 0 |
| ⋮ | ⋮ | ⋮ | ⋮ |

| DUNGEON ID | DUNGEON NAME | DUNGEON LEVEL | EXPERIENCE POINT | ENEMY CHARACTER LEVEL | CLEAR CONDITION | DUNGEON LAYER | MAP ID | NUMBER OF TRAPS |
|---|---|---|---|---|---|---|---|---|
| ID2001 | CAVE OF RAGE | 1 | 35 | 5 | DEFEAT BOSS CHARACTER A | 1 | ID3001 | 2 |
| ID2002 | CAVE OF FLAME | 2 | 70 | 10 | DEFEAT BOSS CHARACTER B | 2 | ID3002 | 4 |
| .... | .... | .... | .... | .... | .... | .... | .... | .... |

FIG. 11

| DUNGEON LEVEL | NECESSARY EXPERIENCE POINT | ENEMY CHARACTER LEVEL | CLEAR CONDITION | DUNGEON LAYER | NUMBER OF TRAPS |
|---|---|---|---|---|---|
| 1 | 50 | 1 TO 5 | DEFEAT BOSS CHARACTER A / DEFEAT BOSS CHARACTER B / ACQUIRE ITEM E | 1 | 1 TO 5 |
| 2 | 100 | 6 TO 10 | DEFEAT BOSS CHARACTER C / DEFEAT BOSS CHARACTER D / REACH F POINT | 2 | 6 TO 10 |
| .... | .... | .... | .... | .... | .... |

GAME SYSTEM FOR CHANGING A DIFFICULTY LEVEL OF A GAME

CROSS REFERENCE TO RELATED APPLICATION

The present disclosure relates to subject matter contained in Japanese Patent Application No. 2011-286122, field on Dec. 27, 2011 and Japanese Patent Application No. 2012-027624, field on Feb. 10, 2012, the disclosure of which is expressly incorporated herein by reference in its entirety.

BACKGROUND OF THE INVENTION

1. Field of the Invention

The present invention relates to a game system that is connectable between a server apparatus and a client apparatus by communication and enables a player to play a network game.

2. Description of Related Art

A network game, which allows a plurality of players to play a game by accessing a server through a computer network, is popularized (for example, Japanese Patent Application Laid-Open (JP-A) No. 2009-9510). In order to use a network game, it may be necessary to pay a flat-rate usage fee monthly or it may be necessary to pay a fee for purchasing an item used in a game, although the game is fee-free.

Patent Document 1: Japanese Patent Application Laid-Open (JP-A) No. 2009-9510).

However, in terms of development cost recovery and improve profitability, it is desirable for a game system operator that a network game is played continuously over a relatively long period. Therefore, a game system operator is endeavoring to increase the desire of a player to continuously play a game, by improving a game system or adding a new game scenario, a field map, a character, or the like.

However, since a method of improving a game system or adding a game scenario requires a new development burden of a game system operator and also has a limitation in terms of the improvement effect, it is insufficient to motivate a player to iteratively play a game. Therefore, there is a need to develop a new profit model and a new game operation model for improving profitability and development cost reduction.

An object of the present invention is to provide a high-preference game system that can reduce a game development burden of a game system operator, can increase the desire of a player to iteratively play a game, and enables a player to play a game without aversion. Another object of the present invention is to provide a new profit model and a new game operation model in a network game by devising a game system and a server configuration.

SUMMARY OF THE INVENTION

The present invention relates to a game system that is connectable between a client apparatus and a server apparatus by communication, comprising: a game progress controller that controls a progress of a game according to a predetermined game program, wherein the client apparatus includes a game open requester that transmits a game open request to the server apparatus, the server apparatus includes a point storage that stores points retained by a player operating the client apparatus; an amenity point storage that stores an amenity point that is given as an amenity to the player; a point subtractor that subtracts the points, which are stored in the point storage and retained by the player, when receiving the game open request from the client apparatus; a condition determiner that determines whether the game progressed by the game progress controller satisfies a predetermined condition; an amenity point reserver that reserves an amenity point by adding a part or all of the points subtracted by the point subtractor to the amenity point stored in the amenity point storage, when the condition determiner determines that the predetermined condition is not satisfied; and an amenity point adder that gives an amenity point by adding a part or all of the amenity points stored in the amenity point storage to the point retained by the player operating the client apparatus, when the condition determiner determines that the predetermined condition is satisfied, and the game progress controller controls the progress of the game in the client apparatus when the server apparatus receives the game open request from the client apparatus (hereinafter, also referred to as the first invention).

According to the present invention, each of a plurality of players may play a predetermined game by accessing a server apparatus by operating its own client apparatus. The server apparatus manages points retained by each player, and subtracts points retained by a player whenever the player plays a game. The points may be virtual currency, or may be converted into current money in the real world. For example, when the points can be converted into current money in the real world, a player may purchase points by paying a fee to a game system operator, and may play a game by consuming the points.

Also, when a player plays a game and fails to clear a predetermined condition set in the game (for examples, defeating a boss character, acquiring a specific item, or the like), a part or all of the points consumed by the player to open the game is pooled as points belonging to the game. Then, when another player plays the game and succeeds in clearing the predetermined condition, the pooled points are given to this another player. Accordingly, in order to acquire more points, players competitively play the game and aim to clear the game earlier than any other players, which enables to increase the desire to play the game. Also, when the player fails to clear the predetermined condition set in the game, and if only a part of the points consumed by the player to open the game is pooled as points belonging to the game, the non-pooled remaining points become a profit of the game system operator.

The following case may be taken as an example. It is assumed that players $A_1$, $A_2$, and the like play a game operated by a game system operator B. The game system operator B has a "content C" that has a predetermined clear condition. Also, a game capable of clearly determining whether a player A succeeds in clearing a predetermined condition will be referred to as a "content" in the instant specification.

When the player $A_1$ pays $X_1$ yen to use the content C, $Y_1$ yen among $X_1$ yen is given to the game system operator B. The remaining $(X_1-Y_1)$ yen is deposited in an account D. When the player $A_1$ succeeds in clearing the content C, the player $A_1$ obtains the balance $(X_1-Y_1)$ of the account D. When the player $A_1$ fails to clear the content C, the player $A_1$ obtains nothing.

Then, when the next player $A_2$ pays $X_2$ yen to use the content C ($X_2$ may be equal to or different from $X_1$. When $X_2$ is not equal to $X_1$, $X_2$ is determined by the game system operator B or by multiplying a coefficient according to the amount of the account D or the number of players using the content C by $X_1$, or the like. Even when the same content C is used, if there is a possibility that $X_2$ is not equal to $X_1$, it is configured such that the players can clearly recognize that the absolute amount of the payment X of each player), $Y_2$ yen among $X_2$ yen ($Y_2$ may be equal to or different from $Y_1$. When $Y_2$ is not equal to $Y_1$, $Y_2$ is determined by the game system operator B or by multiplying a coefficient according to the amount of the account D or the number of players using the content C by $Y_1$, or the like.) is given to the game system operator B. The remaining $(X_2-Y_2)$ yen is deposited in the account D. When the player $A_2$ succeeds in clearing the content C, the player $A_2$ obtains the balance of the account D. When the player $A_2$ fails to clear the content C, the player $A_2$ obtains nothing.

Herein, when the player $A_1$ fails to clear the content C and the player $A_2$ uses the content C, the balance of the account D is $((X_1-Y_1)+(X_2-Y_2))$ yen. Thus, the player $A_2$ succeeds in clearing the content C, the player $A_2$ can obtain all the balance $((X_1-Y_1)+(X_2-Y_2))$ yen of the account D.

The balance of the account D is accumulated until anyone of the players A succeeds in clearing the content C. If none of the players A succeeds in clearing the content C, the balance of the account D is reset to 0 yen after lapse of a predetermined time from when the content C is finally cleared, or when the balance of the account D becomes an upper limit.

Also, the content (game) described herein includes not only a complete game such as a role playing game (RPG), a shooting game, or the like, but also a mini game attached to a main game. For example, when a main game is an RPG, a mini game includes an exploration in dungeons or the like, which is possible when a player character reaches a dungeon, a castle, a tower or the like displayed on a field map and a new field map is displayed so that the player character can move.

The present invention relates to a game system that is connectable between a client apparatus and a server apparatus by communication, comprising: a game progress controller that controls a progress of a game according to a predetermined game program, wherein the client apparatus includes a game open requester that transmits a game open request to the server apparatus, the server apparatus includes a game information storage that stores game information affecting a difficulty level of the game; and a game information updater that updates the game information stored in the game information storage, according to the reception of a game open request from a player and/or the result of a game progress, and the game progress controller controls the progress of the game according to the game information and the predetermined game program stored in the game information storage, when the server apparatus receives the game open request from the client apparatus (hereinafter, also referred to as the second invention).

As the number of times of playing the game by a plurality of players increases, or as the accumulated play time of the game increases, the game is modified and becomes higher in terms of a difficulty level thereof. For example, when the game is an exploration of a dungeon in an RPG, as the number of players exploring the same dungeon increases, the dungeon is automatically modified and becomes higher in terms of a difficulty level thereof. By this configuration, it may be possible to provide a high-preference game that does not tire a player because its content is automatically modified whenever the player plays the game, even when a game system operator does not provide a new game scenario, a new field map, a new character, or the like.

The present invention relates to a game system that is connectable between first and second client apparatuses and a server apparatus by communication, comprising: a game progress controller that controls a progress of a game according to a predetermined game program, wherein the first client apparatus includes a game management requester that transmits a game management request of a first player operating the first client apparatus, the second client apparatus includes a game open requester that transmits a game open request of a second player operating the second client apparatus to the server apparatus, with respect to a management recording game for which the first player is recorded as a manager, the server apparatus includes a game manager recorder that records the first player as the game manager when receiving the game management request from the first client apparatus; a point storage that stores points retained by the first player and the second player, respectively; and a point subtractor that adds the points retained by the first player and subtract the points retained by the second player, when receiving the game open request from the second client apparatus with respect to the management recording game; and the game progress controller controls the progress of the game by the second player when the server apparatus receives the game open request from the second client apparatus (hereinafter, also referred to as the third invention).

The player not only can play a game by consuming points, but also can purchase the right to own and manage a game by consuming more points. For example, when the game is an exploration of a dungeon in an RPG, a part or all of the points, which are consumed by another player to explore a dungeon owned by a player, may be added to the points of the player owing the dungeon. By this configuration, the player endeavors to collect more points and obtain a dungeon owned by the player, which increases the preference of the game.

Whenever a player explores a dungeon, a difficulty level thereof increases. Therefore, if there is only a dungeon prepared by the game system operator, since a hurdle in clearing the dungeon becomes too high, a player just started the game may not be motivated to play the game and may be taken the fun to play the game. However, if players are allowed to purchase the right to own and manage such a game, the number of games (number of dungeons) increases with the lapse of time and even a player just started the game may play by selecting a dungeon according to his/her own game technique or the level of a player character to operate.

The present invention relates to a server apparatus connectable to a client apparatus by communication, comprising: a game progress controller that controls a progress of a game according to a predetermined game program when receiving a game open request from the client apparatus, a point storage that stores points retained by a player operating the client apparatus; an amenity point storage that stores an amenity point that is given as an amenity to the player; a point subtractor that subtracts the points, which are stored in the point storage and retained by the player, when receiving the game open request from the client apparatus; a condition determiner that determines whether the game progressed by the game progress controller satisfies a predetermined condition; an amenity point reserver that reserves an amenity point by adding a part or all of the points subtracted by the point subtractor to the amenity point stored in the amenity point storage, when the condition determiner determines that the predetermined condition is not satisfied; and an amenity point adder that gives an amenity point by adding a part or all of the points stored in the amenity point storage to the points retained by the player operating the client apparatus, when the condition determiner determines that the predetermined condition is satisfied.

The present invention relates to a server apparatus connectable to a client apparatus by communication, comprising: a game progress controller that controls a progress of a game according to a predetermined game program; a game information storage that stores game information affecting a difficulty level of a game; and a game information updater that updates the game information stored in the game information storage, according to the reception of a game open request from a player and/or the result of a game progress, wherein the game progress controller controls the progress of the game based on the game information stored in the game information storage, when receiving the game open request from the client apparatus.

The present invention relates to a server apparatus connectable to a first client apparatus and a second client apparatus by communication, comprising: a game progress controller that controls a progress of a game according to a predetermined game program, a game manager recorder that records a first player as a manager of the game when receiving a game management request from the first client apparatus; a point storage that stores points retained by the first player and a second player; and a point subtractor that adds the points retained by the first player and subtract the points retained by the second player, when receiving the game open request from the second client apparatus with respect to a management recording game for which the first player is recorded as a manager; wherein the game progress controller controls the progress of the game by the second player when receiving a game open request from the second client apparatus.

BRIEF DESCRIPTION OF THE DRAWINGS

FIG. 5 is a diagram illustrating an example of a point management table according to an embodiment of the present invention;

FIG. 6 is a diagram illustrating an example of a dungeon point management table according to an embodiment of the present invention;

FIG. 9 is a diagram illustrating an example of a dungeon management table according to an embodiment of the present invention;

FIG. 11 is a diagram illustrating an example of a correspondence relation between a dungeon level and other dungeon parameters;

DETAILED DESCRIPTION OF EMBODIMENTS

Figure 1:
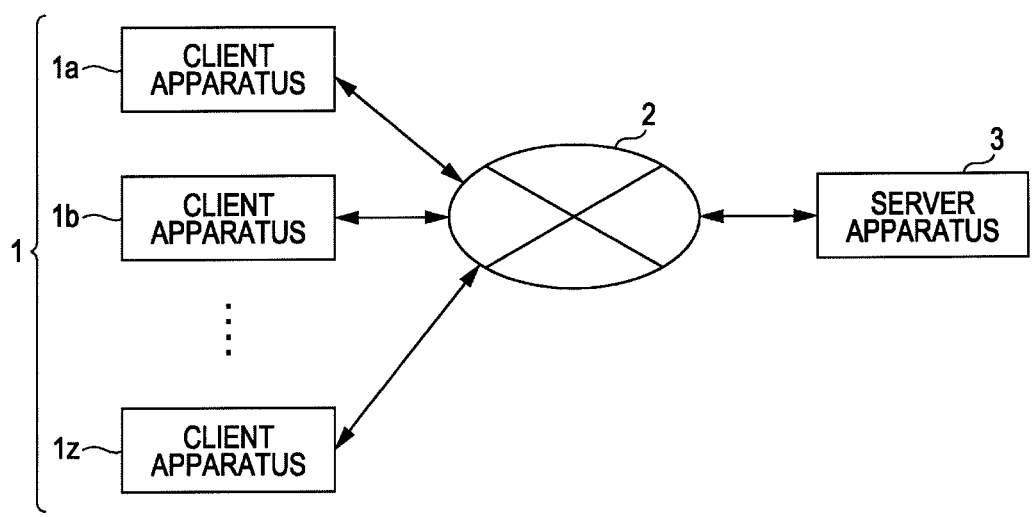
FIG. 1 is a block diagram illustrating a configuration of a network game system according to an embodiment of the present invention.

Hereinafter, embodiments of the present invention will be described with reference to the accompanying drawings. FIG. 1 is a block diagram illustrating a configuration of a network game system according to an embodiment of the present invention. As illustrated in FIG. 1, the network game system includes a plurality of client apparatuses 1 (client apparatuses 1a, 1b, . . . to 1z) operated by a plurality of players (player A, player B, . . . to player Z), a server apparatus 3, and a communication network 2. The client apparatuses 1 are connected to the server apparatus 3 through the communication network 2. The client apparatuses 1a to 1z are connected to the server apparatus 3, and the players may play the same game by operating a player character allocated to each of the client apparatuses 1. Also, in this specification, the client apparatuses 1 include game apparatuses or computer apparatuses that enables players to play a game, and include, for example, a personal computer, a home video game machine, an arcade video game machine, a portable video game machine, a portable phone, a smart phone, a tablet, and the like. The client apparatuses 1 may not constantly be connected to the server apparatus 3, and may be connected to the server apparatus 3 if necessary.

Also, operation instruction information which is input into an input section in the client apparatuses 1 is transmitted to the server apparatus 3, and a game progressing process is performed in the server apparatus 3. Then, as a result of the game progressing, video data is transmitted from the server apparatus 3 to the client apparatuses 1 and is displayed on display devices of the client apparatuses 1. In this case, it may not be necessary to store a game program in the client apparatuses 1 or install a storage medium, in which a game program is stored, in the client apparatuses 1. Also, unlike this, each of the client apparatuses 1 may perform a game program execution process and transmit the execution result to the server apparatus 3 if necessary.

Figure 2:
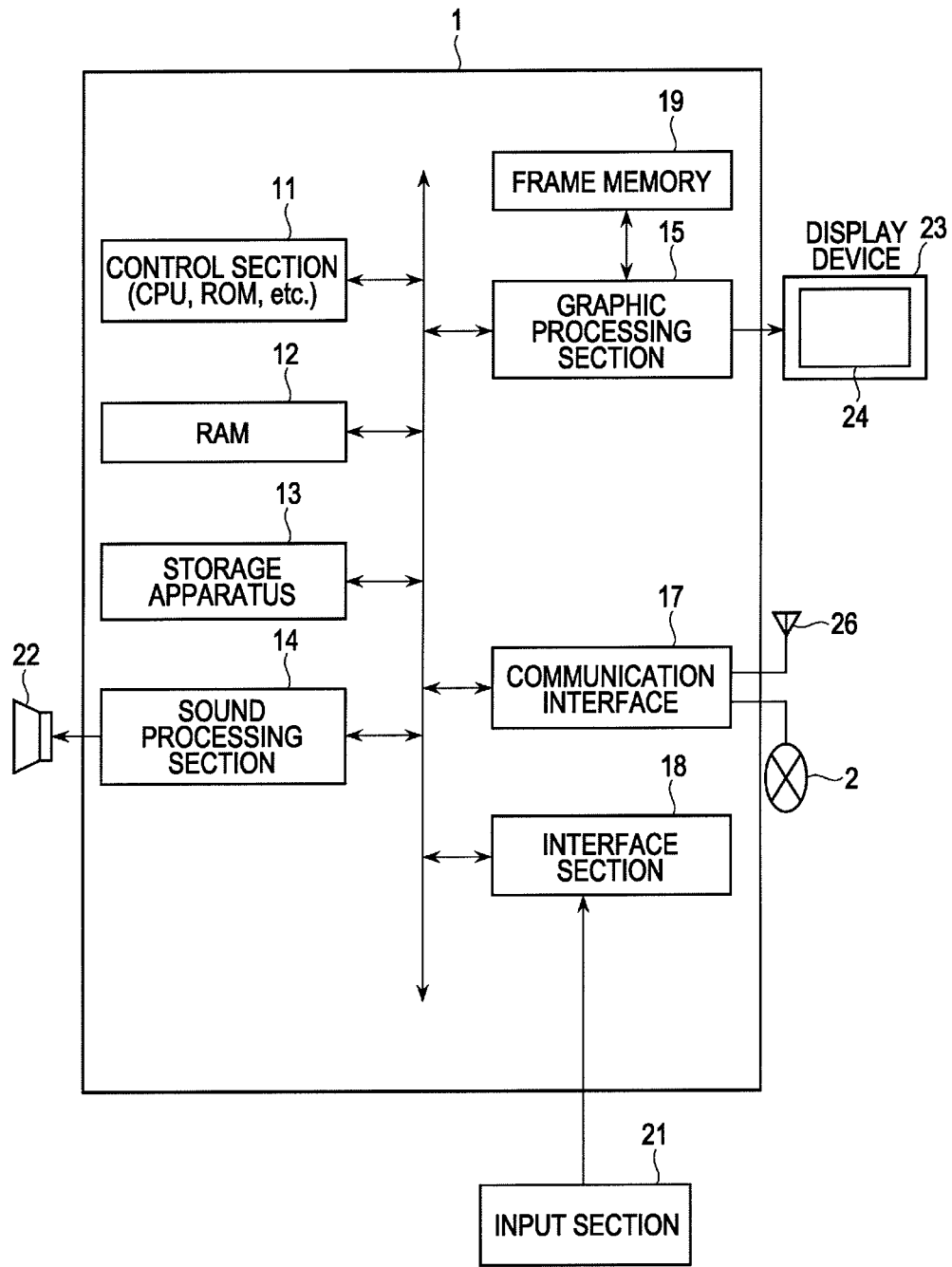
FIG. 2 is a block diagram illustrating a configuration of a client apparatus according to an embodiment of the present invention.

FIG. 2 is a block diagram illustrating a configuration of a client apparatus according to an embodiment of the present invention. A client apparatus 1 includes a control section 11, a random access memory (RAM) 12, a storage apparatus (for example, a hard disk drive (HDD), a semiconductor memory, or the like) 13, a sound processing section 14, a graphic processing section 15, a communication interface 17, and an interface section 18, each of which is connected by an internal bus. The control section 11 includes a central processing unit (CPU) and a read only memory (ROM). Also, the control section 11 includes an internal timer such as a hardware clock that measures time. The RAM 12 is a work area of the control section 11. The storage apparatus 13 is a storage region that stores programs or data.

When video data or audio data is transmitted from a server apparatus 1 as a result of game progressing, the data is stored in the RAM 12. By processing the data stored in the RAM 12, the control section 11 outputs a sound output instruction to the sound processing section 14 and outputs a rendering command to the graphic processing section 15.

Also, in the embodiment, although a description is mainly given of a case where the server apparatus 3 executes a game progressing process and the client apparatus 1 outputs video data and audio data transmitted from the server apparatus 3, the client apparatus 1 may be configured to execute a game progressing process. In this case, the control section 11 controls the client apparatus 1 by executing a program stored or buffered in the storage apparatus 13 or by executing a program stored on a recording medium (not illustrated). A program and data necessary to progress a game are read from a recording medium 25 and loaded into the RAM 12, and the control section 11 performs a process by reading the program and data, which are necessary to progress a game, from the RAM 12.

The sound processing section 14 is connected to a sound outputting device 22, which is a speaker. When the control section 11 outputs a sound output instruction to the sound processing section 14, the sound processing section 14 outputs a sound signal to the sound outputting device 22.

The graphic processing section 15 is connected to a display device 23. The display device 23 has a display screen 24. When the control section 11 outputs a rendering command to the graphic processing section 15, the graphic processing section 15 develops an image in a frame memory (frame buffer) 19 and outputs a video signal that is used to display an image on the display screen 24. The graphic processing section 15 executes rendering of one image in units of frames. 1-frame time of an image is, for example, 1/30 second.

An input section 21 is connected to the interface section 18. Input information from the input section 21 by the player is stored in the RAM 12 or the like, and the control section 11 executes a variety of arithmetic processings based on the input information. Specific examples of the input section 21 may include not only a touch panel configured to also serve as the display screen 24 of the display device 23, but also a button, a lever, a keyboard, a mouse, a touch pad, and the like.

The communication interface 17 is connected to a communication network 2 in a wireless or wired manner, and transmits and receives operation instruction information or information about a game progress status with the server apparatus 3 if necessary. Also, the communication interface 17 may perform wireless communication with other client apparatuses 1 through a communication unit having an antenna 26.

Specific examples of the above-configured client apparatus 1 include a personal computer, a home video game machine, an arcade video game machine, a portable video game machine, a portable phone, a smart phone, a tablet, and the like, but the invention is not limited thereto.

Figure 3:
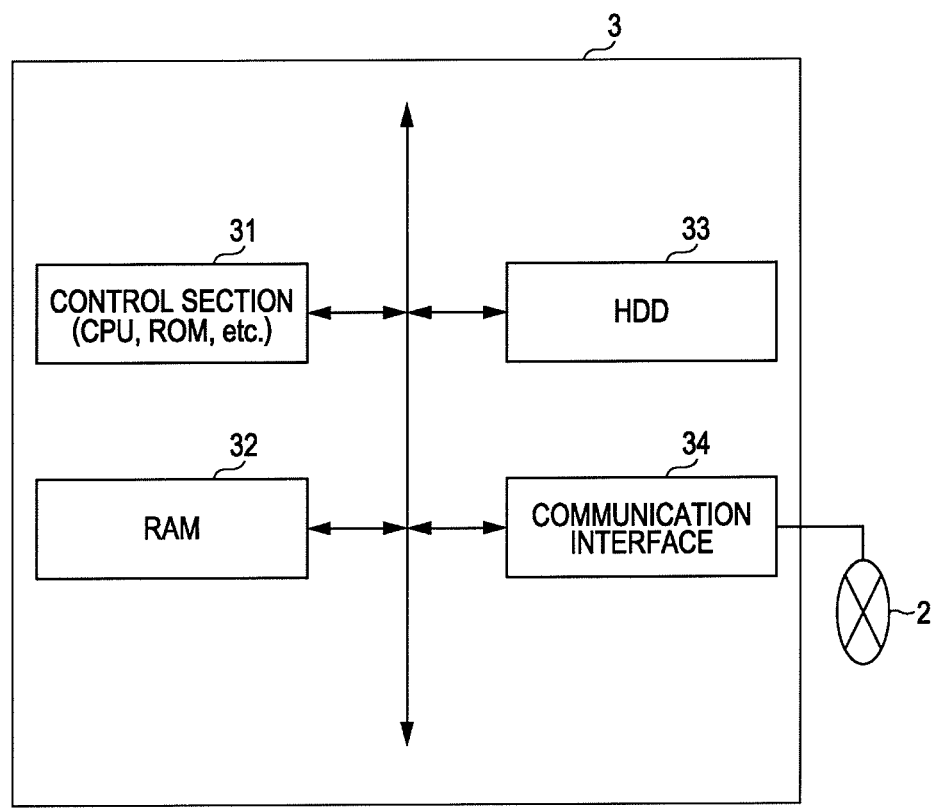
FIG. 3 is a block diagram illustrating a configuration of a server apparatus according to an embodiment of the present invention.

FIG. 3 is a block diagram illustrating a configuration of a server apparatus according to an embodiment of the present invention. A server apparatus 3 includes a control section 31, a RAM 32, a HDD 33, and a communication interface 34, each of which is connected by an internal bus.

The control section 31 includes a CPU and a ROM. The control section 31 controls the server apparatus 3 by executing a game program stored in the HDD 33. Also, the control section 31 includes an internal timer that measures time. The RAM 32 is a work area of the control section 31. The HDD 33 is a storage region configured to store programs or data. The control section 31 reads a program and data, which are necessary to progress a game, from the RAM 32, and performs a game progressing process based on operation instruction information received from the client apparatus 1.

A specific example of the server apparatus 3 includes a computer or the like. The server apparatus 3 may include one computer or the like, and may include a plurality of computers or the like.

Figure 4A:
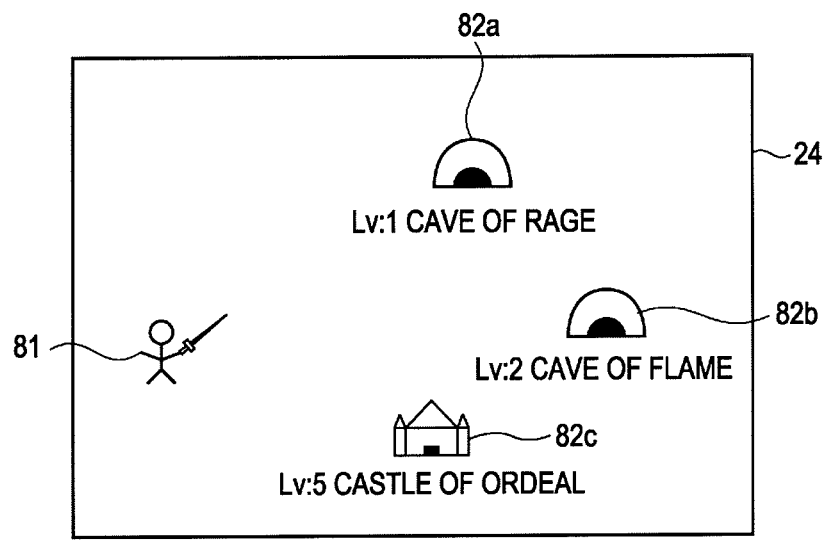
FIGS. 4A and 4B are diagrams illustrating an example of a display screen of a client apparatus according to an embodiment of the present invention.
Figure 4B:
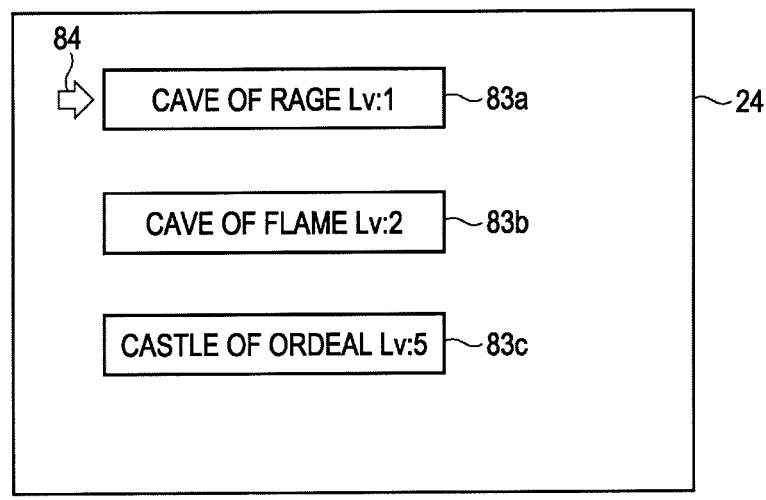

Next, a description will be given of a case of exploring a dungeon as a mini game in an RPG in the invention. FIGS. 4A and 4B illustrate an example of a display screen of a client apparatus according to an embodiment of the present invention. For example, as illustrated in FIG. 4A, dungeon or castle objects 82a to 82c on a field map may be displayed on the display screen 24. A player character 81 may move on the field map and touch the dungeon objects 82a to 82c, so that a map in a dungeon may be displayed and an exploration of the dungeon by the player character 81 may be started. By touching objects of towers, ruins, or the like, in addition to dungeons or castles, the player character 81 may explore in them. Also, an object 82 displayed on the display screen 24 may be selected by a cursor or the like, so that a dungeon status such as a dungeon level, a pool point, or the like, which will be described later, may be displayed.

Also, for example, as illustrated in FIG. 4B, buttons 83a to 83c corresponding to dungeons explorable by a player may be displayed on a display screen 24, and the player may select a button 83 among the plurality of buttons 83a to 83c, which corresponds to a dungeon to explore, by a cursor 84. A dungeon level or a pool point may be displayed on the button 83.

FIG. 5 is a diagram illustrating an example of a point management table according to an embodiment of the present invention. A point management table 40 is set in a storage region of a server apparatus 3 to manage points of a player. A retention point 42 is stored in the point management table 40 in relation to a player ID 41. The player ID 41 is used to identify each player. The retention point 42 is an ID that is used to store a value of points retained by each player.

The retention point 42 may be virtual cash used in a game, and may also be converted into current money in the real world. Also, the retention point 42 may have a function of improving the capability of a player character. For example, when the retention point 42 is greater than or equal to a predetermined value, a special capability may be given to a player character. Also, when the retention point 42 can be converted into current money, the total amount of points consumed when a player logs out of a game may be settled and a payment may be made with a credit card or the like.

FIG. 6 is a diagram illustrating an example of a dungeon point management table according to an embodiment of the present invention. A dungeon point management table 50 is set in a storage region of a server apparatus 3 to manage points pooled in a dungeon. A pool point 52, a temporary pool point 53, and a player management flag 54 are stored in the dungeon point management table 50 in relation to a dungeon ID 51.

The dungeon ID 51 is an ID that is used to identify each dungeon. The pool point 52 is a point that is temporarily pooled in a dungeon when a player explores the dungeon and fails to satisfy a clear condition set for each dungeon. When a plurality of players fails to satisfy a clear condition of a dungeon, the pool point 52 is reserved so much more. When one player succeeds in satisfying a clear condition of a dungeon, the reserved pool point 52 is given to the player that satisfies the clear condition. In this way, a player competitively plays in order to clear a dungeon more quickly than any other players, which assists in increasing the communication between plural players.

Also, the temporary pool point 53 is a part or all of the points consumed by a player. The temporary pool point 53 is a point that is derived from a player that is in the midst of playing a game in a dungeon. That is, when a player is playing a game in a dungeon and it is not yet determined whether the player will satisfy a clear condition, it is not yet determined whether points of the player will be reserved as the temporary pool point 52. When the player fails to satisfy the clear condition, the temporary pool point 53 is subtracted and added to the pool point 52 at that time. When the player succeeds in satisfying the clear condition, the temporary pool point 53 is subtracted and added to the retention point 52 of the character at that time.

The player management flag 54 is a flag that is set when a player owns and manages a dungeon. When a dungeon is not a dungeon that is owned and managed by a player, the player management flag 54 is not set.

Figure 7:
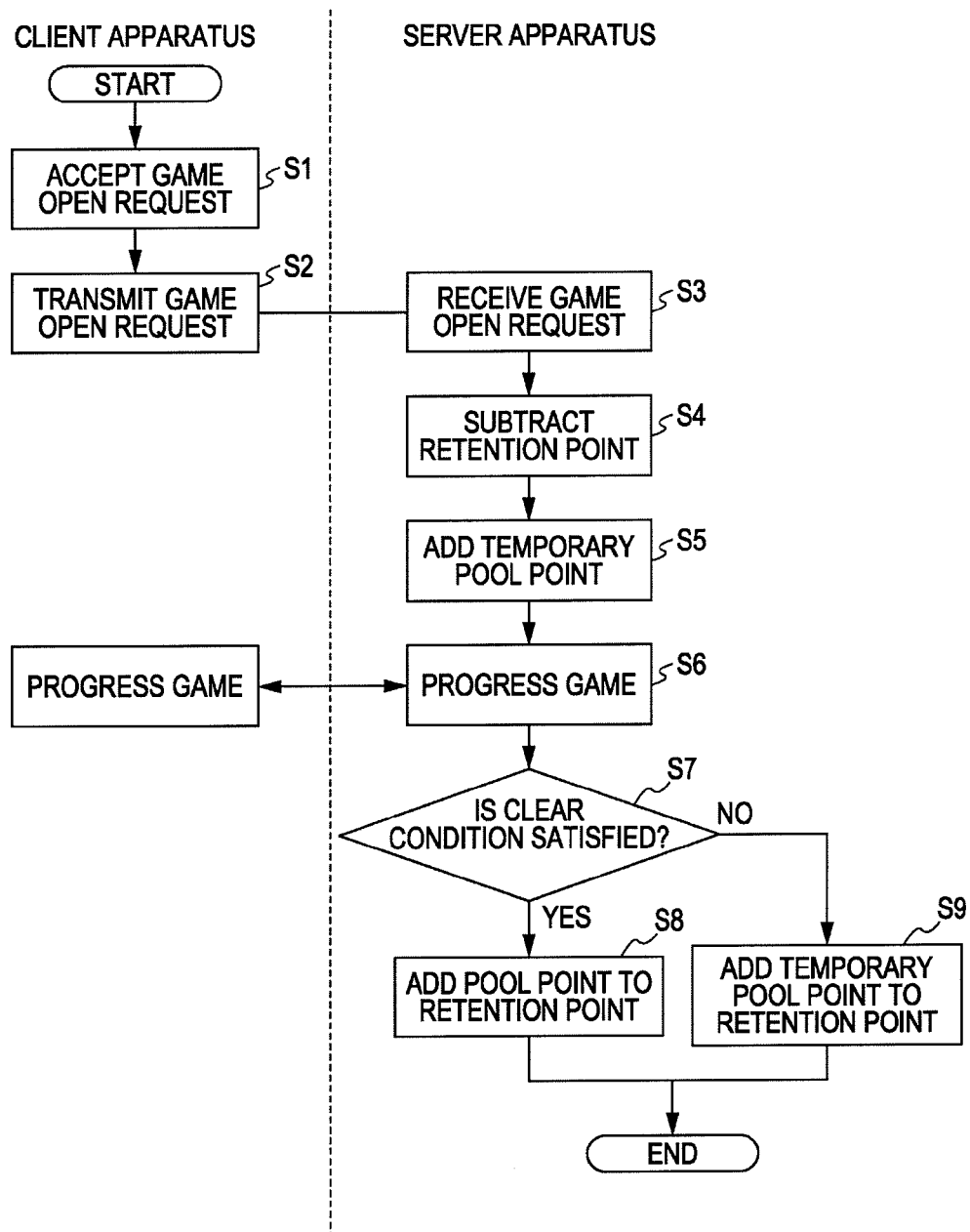
FIG. 7 is a diagram illustrating an example of a flow chart in processing points according to an embodiment of the present invention.

FIG. 7 is a diagram illustrating an example of a flow chart in processing points according to an embodiment of the present invention. A client apparatus 1 receives an input of a game open request for a dungeon by the player by selecting the dungeon or moving a player character to the dungeon, or the like (Step S1), then, the client apparatus 1 transmits the game open request for the dungeon to a server apparatus 3 (Step S2). In step S3, the server apparatus 3 receives the game open request from the client apparatus 1. Then, with respect to the player that selected the dungeon, a retention point 42 of a point management table 40 set in the server apparatus 3 is subtracted in step S4, and a part or all of the subtracted points is added as a temporary pool point 53 in step S5.

For example, the retention point 42 of the point management table 40 is subtracted by 5 points, and 2 points are added to the temporary pool point. A value of the subtracted points may be constant regardless of which dungeon is explored, and may vary according to the difficulty levels of dungeons. In general, as the difficulty level of a dungeon becomes higher, the technique of a player challenging the dungeon becomes higher and the level of a player character also becomes higher. Therefore, it may be preferable that more points be needed.

Also, when a player management flag 54 is set in a dungeon point management table 50, a retention point 42 of a player opening a game in the dungeon is subtracted and a part or all of the subtracted points is added to a retention point 42 of a player owing the dungeon, in step S4.

Thereafter, in step S6, a game in the dungeon is opened and progressed. The server apparatus 3 may execute a game progress control process while receiving necessary information, such as operation information used by a player to operate a player character, from the client apparatus 1, and may transmit the result of the game progress control process to the client apparatus 1. Also, the client apparatus 1 may download dungeon-related information and the like from the server apparatus 3, if necessary, and the client apparatus 1 may execute a game progress control process. In this case, information as to whether a clear condition is cleared by the player is notified from the client apparatus 1 to the server apparatus 3 at the time when the clear condition is satisfied or at the time when a game in a dungeon is closed.

When the game is progressed in step S6 and the player succeeds in satisfying the clear condition set in the dungeon (YES in step S7), the sum points of a pool point 52 and a temporary pool point 53 are added to a retention point 42 of the player in step S8. Then, a series of processing is ended.

On the other hand, when the player fails to satisfy the set clear condition, such as when the player becomes incapable of fighting due to a battle with an enemy character in the dungeon or when the player fails to satisfy a necessary condition within a predetermined time limit (NO in step S7), a temporary pool point 53 derived from the player is added to a pool point 52 in step S9. Then, a series of processing is ended.

Figure 8A:
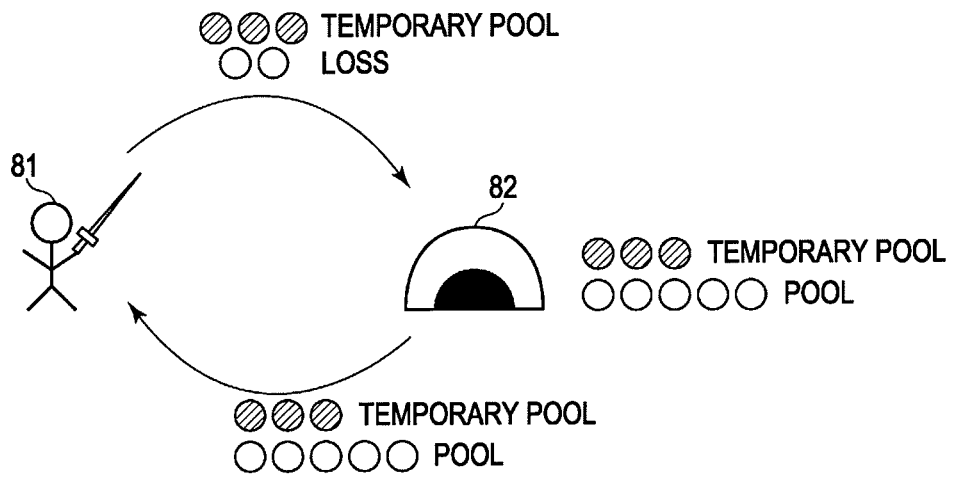
FIGS. 8A to 8C are conceptual diagrams illustrating a flow of points according to an embodiment of the present invention.
Figure 8B:
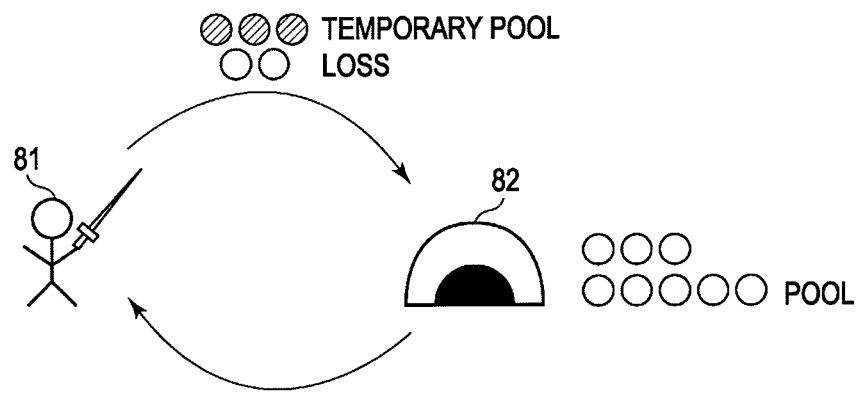
Figure 8C:
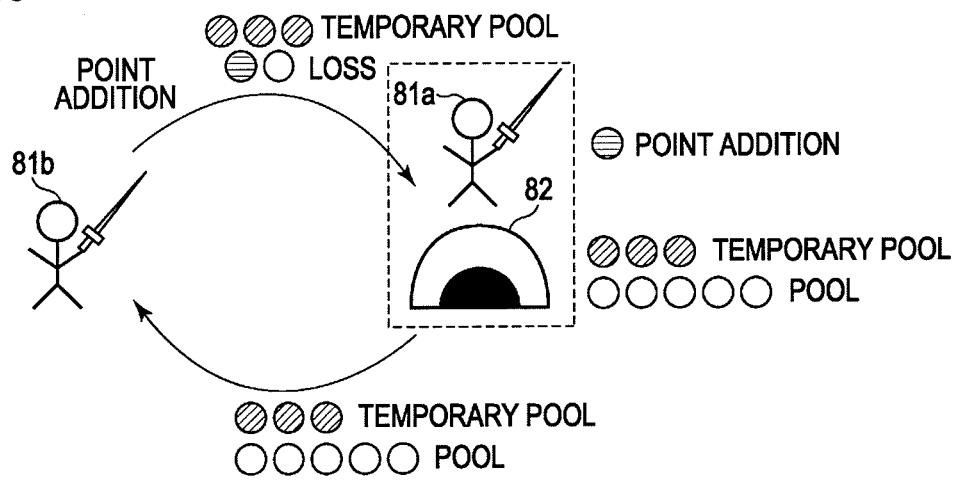

FIGS. 8A to 8C are conceptual diagrams illustrating a flow of points according to an embodiment of the present invention. A series of processing in steps S1 to S9 of FIG. 7 may be applicable not only to a case where an owner of a dungeon is not specifically defined as illustrated in FIGS. 8A and 8B, but also to a case where a player purchases, owns and manages a dungeon as illustrated in FIG. 8C.

In FIG. 8A, for example, when a player 81 requests a game open in a dungeon 82 by operating a client apparatus 1, 5 points among a retention point 42 of the player 81 are consumed. In this case, 3 points are temporarily pooled in the dungeon 82. When the player 81 succeeds in satisfying a clear condition of the dungeon 82, 8 points as the sum of temporarily pooled 3 points and 5 points pooled in the dungeon 82 as a result of the plays by other players are added to a retention point of the player 81. Also, when the player 81 fails to satisfy the clear condition of the dungeon 82, it is determined that temporarily pooled 3 points are pooled in the dungeon 82 as illustrated in FIG. 8B.

Also, among 5 points consumed by the player 81 to open a game, the remaining 2 points that are not temporarily pooled are lost. However, when the points can be converted into current money, the remaining 2 points that are not temporarily pooled become a profit of a game system operator.

In FIG. 8C, for example, when a player 81b operates a client apparatus 1 to request a game open in a dungeon 82 owned by a player 81a, 5 points among a retention point of the player 81b are consumed. In this case, 3 points are temporarily pooled in the dungeon 82. Also, among 5 points consumed by the player 81b, 1 point is added to a retention point 42 of the player 81a. Also, when the points can be converted into current money, the other remaining 1 point among the 5 points consumed by the player 81b becomes a profit of a game system operator.

When the player 81b succeeds in satisfying a clear condition of the dungeon 82, 8 points as the sum of temporarily pooled 3 points and 5 points that have been pooled in the dungeon 82 are added to a retention point 42 of the player 81b. Also, when the player 81b fails to satisfy the clear condition of the dungeon 82, it is determined that temporarily pooled 3 points are pooled in the dungeon 82. Also, it may be configured such that only the player 81a owning the dungeon can know the sum value of points that can be obtained by a player satisfying the clear condition, from the points pooled in the dungeon or from the points consumed by a currently playing player. An owner of the dungeon may detect that obtainable points increase to some extent. Also, as will be described later, the owner of the dungeon may personally play the dungeon, satisfy the clear condition, and obtain more points.

The player 81a owing the dungeon may personally play in the dungeon in order to attract more players in the dungeon he owns. In addition, the player 81a may edit the dungeon he owns, and may edit the type, level, name, status, design and the like of an enemy character appearing in the dungeon, or the type, name, status, design and the like of an item obtainable in the dungeon. In addition, the player 81a may change the shape of a map in the dungeon. Also, the player 81a owing the dungeon may change a clear condition for clearing the dungeon. Also, it may be set such that by clearing the dungeon, another player can obtain a specific item owned by the player 81a, or can obtain virtual currency, which is owned by the player 81a, as a prize.

When purchasing a dungeon, a player may select a dungeon that has a function of adding points to an owner when another player (non-owner) plays the dungeon, or a dungeon that does not have a function of adding points to an owner when another player plays the dungeon. In general, it takes more points to purchase a dungeon that has a function of adding points to an owner when another player plays the dungeon. A dungeon, which does not have a function of adding points to an owner when another player plays the dungeon, can be edited by the owner. However, when another player plays the dungeon, the points are processed as illustrated in FIGS. 8A and 8B.

Also, a dungeon to be purchased may be limited in the dungeon owning period of a player (dungeon lifetime). In this case, if a predetermined time has elapsed after a dungeon is purchased, the dungeon is disappeared or is owned by nobody (that is, the dungeon is owned by an operator of the game system). When purchasing a dungeon, a player may set a dungeon owning period. When a player sets a longer dungeon owning period, it takes more points to purchase a dungeon.

FIG. 9 is a diagram illustrating an example of a dungeon management table according to an embodiment of the present invention. A dungeon name 62, a dungeon level 63, an experience point 64, an enemy character level 65, a clear condition 66, a dungeon layer 67, a map ID 68, and the number of a trap 69 are stored in a dungeon management table 60 in relation to a dungeon ID 61 (corresponding to a dungeon ID 51 of a dungeon point management table).

The dungeon level 63 represents the height of a dungeon difficulty level. Like a player character, a dungeon also has an experience point 64. Thus, when the experience point 64 exceeds a predetermined value (necessary experience points that will be described below), the dungeon level 63 increases and the dungeon difficulty level also increases.

A dungeon may acquire an experience point 64 in various ways. For example, a dungeon may acquire an experience point 64 at the time when a player character starts a dungeon exploration. As another example, a dungeon may acquire an experience point 64 when a player character battles with an enemy character in the dungeon. In this case, as a player character is stronger, that is, when the level is higher, the dungeon may acquire more experience points. Also, when an enemy character defeats a player character or when a player character fails to clear a clear condition of the dungeon, the dungeon may acquire more experience points 64. Also, the dungeon may acquire an experience point 64 merely when a player character starts a dungeon exploration.

The enemy character level 65 represents the power (level) of an enemy character that appears in a dungeon. When the dungeon level 63 increases, the enemy character level 65 also increases. The clear condition 66 is a condition for clearing a dungeon. For example, that a player character wins a battle with a specific boss character, acquires a specific item, or reaches a specific place may be set as a condition for clearing the dungeon. Also, the clear condition may have a time limit such as 'acquiring a specific item within 15 minutes'.

The dungeon layer 67 represents the depth of a dungeon. As the dungeon level 63 becomes higher, the dungeon becomes deeper and the dungeon clear difficulty level also becomes higher. Also, the number of the traps 69 is the number of the traps provided in a dungeon. As the dungeon level 63 becomes higher, the number of the traps 69 increases and the dungeon clear difficulty level also becomes higher.

A map is generated when a player character explores a dungeon. For example, like 1 to 100 layers, map information of up to the deepest layer is prepared in advance. As the dungeon level becomes higher, a pathway connected to a new layer may appear, or stairs or traps may be installed, so that an exploration to the deeper layer may be possible. As for the map information of all layers of 1 to 100 layers, a plurality of patterns may be prepared in advance, and which pattern of map information to use may be determined based on the map ID 68.

Figure 10:
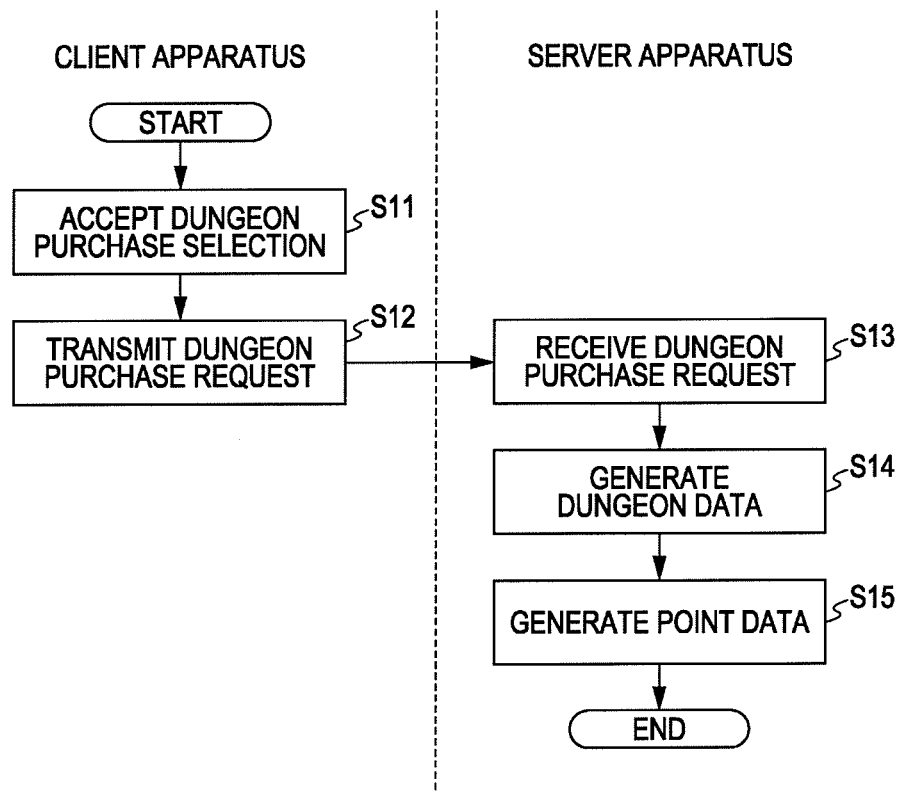
FIG. 10 is a diagram illustrating an example of a flow chart of a dungeon generation process for generating a dungeon according to an embodiment of the present invention.

Next, a dungeon generation process will be described. FIG. 10 is a diagram illustrating an example of a flow chart of a dungeon generation process for generating a dungeon. A player may purchase, own, and manage a dungeon by using predetermined points.

First, in step S11, a player provides a dungeon purchase selection in a client apparatus 1 by controlling an input. Then, in step S12, the client apparatus 1 transmits a dungeon purchase request to a server apparatus 3. Also, dungeons (contents) purchasable by players may include not only dungeons (contents) that are not at all played by players and have an initial value, but also dungeons (contents) that are already played by players and are changed from an initial state. Therefore, the player may select a desired one among a plurality of dungeons that are different in terms of the dungeon level 63. Also, as will be described later, when an attribute such as 'fire' or 'water' is set to each dungeon, the player may select a desired one among a plurality of dungeons that have different attributes.

In step S13, the server apparatus 3 receives the dungeon purchase request. Then, in step S14, data related to a new dungeon is generated in a dungeon management table 60 that will be described later. A dungeon name 62 stored in a dungeon management table may be input by the player when a dungeon is purchased. A status in a dungeon is randomly specified according to a correspondence relation between a dungeon level and other dungeon parameters as illustrated in FIG. 11. For example, as for an enemy character level of a dungeon having a dungeon level of '1', a random level of '1 to 5' becomes an enemy character level of a newly generated dungeon. Likewise, as for a clear condition, a random condition among a plurality of clear conditions is specified according to the correspondence relation illustrated in FIG. 11. Also, a map shape is specified by specifying a random map ID 68 from a plurality of map information items, and in addition, determining a layer accessible by a player character according to the correspondence relation illustrated in FIG. 11.

Thereafter, in step S15, data related to the newly generated dungeon is generated in a dungeon point management table. In this case, the values of an initial pool point 52 and a temporary pool point 53 stored in a dungeon point management table 50 is generally 0 point. Also, a player management flag 54 is also set.

FIG. 11 is a diagram illustrating an example of a correspondence relation between a dungeon level and other dungeon parameters. The dungeon level is related to the level of an enemy character generated in the dungeon, and the way how the dungeon will grow is determined according these correspondence relations.

The correspondence relation between a dungeon level and other parameters are preset in a storage region of the server apparatus 3, in which necessary experience points, an enemy character level, a clear condition, a dungeon layer, and the number of traps are stored in relation to the dungeon level. The necessary experience points are experience points of a dungeon that are necessary to become a relevant dungeon level. Therefore, when the experience points are greater than or equal to 50, the dungeon level is '2'; and when the experience points are greater than or equal to 100, the dungeon level is '3'.

Figure 12:
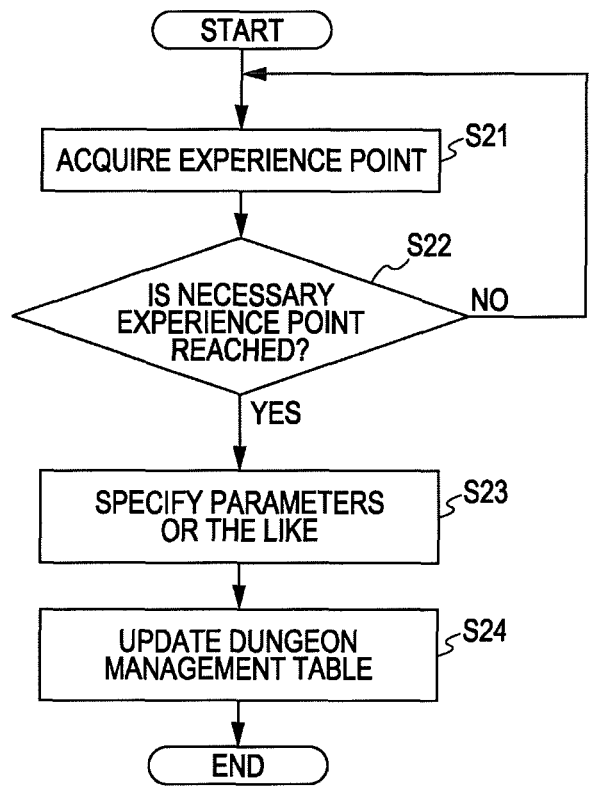
FIG. 12 is a diagram illustrating an example of a flow chart of a dungeon growth process for growing a dungeon according to an embodiment of the present invention.

Next, a dungeon growth process will be described. FIG. 12 is a diagram illustrating an example of a flow chart of a dungeon growth process for growing a dungeon according to an embodiment of the present invention. In step S21, a player explores a dungeon, and the dungeon acquires an experience point. Then, in step S22, it is determined whether experience points of the dungeon reach necessary experience points until the dungeon becomes a next level. When the experience points of the dungeon do not reach the necessary experience points (NO in step S22), the process returns to step S21.

When the experience points of the dungeon reach the necessary experience points (YES in step S22), the process proceeds to step S23. In step S23, as illustrated in FIG. 11, map information or parameters for generating a dungeon are specified according to the correspondence relation between a predetermined dungeon level and other dungeon parameters. For example, an enemy character level 65, a clear condition 66 for clearing a dungeon, a dungeon layer 67, or the like is specified. As for a map of the dungeon, 1 to 100 layers may be prepared, and traps or stairs for descending to lower layers may be installed according to the dungeon level 63. When dungeon parameters after growth are specified in step S23, such information is stored in a dungeon management table in step S24. Then, a series of processing is ended.

Also, even the dungeons of the same dungeon level may have a variation in the appearing enemy character and boss character, the object displayed on a dungeon map, or the like. For example, an attribute may be preset for each player character; and when battling with a player character, a dungeon may acquire experience points related to the attribute of the player character, and the dungeon may grow according to the experience points. For example, when there are many battles with a player character having an attribute of 'fire', it becomes a dungeon having an attribute of 'fire' (that is, an enemy character related to fire appears, or a pillar of fire is generated on the map).

In addition, the dungeon may grow according to the type of an action taken by the player character. For example, when the ratio of a blow attack is high, an enemy character skillful at a blow attack is apt to appear; and when the ratio of a magic attack is high, an enemy character skillful at a magic attack is apt to appear.

Figure 13:
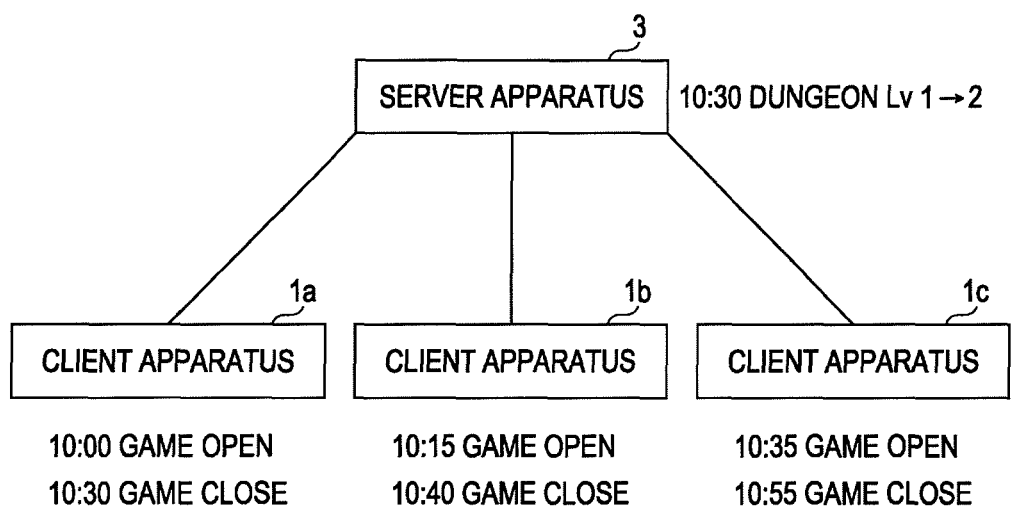
FIG. 13 is a diagram for explaining a relation between the game open time of a player and the growth of a dungeon.

Next, a relation between the game open time of a player and the growth of a dungeon will be described. FIG. 13 is a diagram illustrating a relation between the game open time of a player and the growth of a dungeon. When a plurality of players play the same game (dungeon) in the same time period, a plurality of tasks for each player are generated in the server apparatus 3, and a game is progressed for each task. In this case, unlike Massive Multiplayer Online Role Playing Game (MMORPG), a player character operated by another player does not appear in a game, and the game is progressed with only the player itself. The same is true of a case where a predetermined program for progressing the game or the like is downloaded in each client apparatus 1, and the program is executed in each client apparatus 1.

For example, it is assumed that a player A playing a client apparatus 1a starts an exploration in a dungeon at 10:00 a.m., satisfies a clear condition set in the dungeon at 10:30 a.m., and ends the exploration of the dungeon. It is assumed that experience points of the dungeon reach a predetermined value at 10:30 a.m. in a game progress by a player A, and thus a dungeon level increases from '1' to '2'. Herein, if it is assumed that a player B starts an exploration in a dungeon at 10:15 a.m., the player B plays a dungeon having a dungeon level of '1', which is the same as the dungeon played by the player A. On the other hand, if it is assumed that a player C starts an exploration in a dungeon at 10:35 a.m., the player C plays a dungeon at the time of 10:30 a.m., that is, a dungeon having a dungeon level of '2'. In this manner, even when there are a plurality of players playing the same dungeon in the same time period, experience points may be given to a dungeon at a predetermined timing, such as the dungeon exploration end time of each player, to grow the dungeon. In this case, when another player starts a play before the growth of a dungeon, it may play in a dungeon before growth; and when another player starts a play after the growth of a dungeon, it may play in a dungeon after growth. By this configuration, it is possible to prevent a variation or inconsistency from occurring in the content of a dungeon due to a difference in play start time when there are a plurality of players playing the same dungeon in the same time period.

Also, in this case, although the player A satisfying a clear condition of a dungeon acquires a point pooled in the dungeon, the satisfaction of the clear condition by the player A may be notified to the player B or the player C, and the game in the dungeon may be stopped. In this case, all of the points consumed by the player B and the player C, or the temporarily pooled points may be returned to the player B and the player C, respectively. By stopping the game in the above manner, it is possible to prevent the points from being overlappingly added to a plurality of players, because the points are added not only to the player A but also to the player B and the player C when the player B or the player C satisfies the clear condition.

Also, when the player A satisfies a clear condition of a dungeon, the satisfaction of the clear condition by the player A may be notified to the player B or the player C, and then the player B or the player C may play a game in the dungeon to the last without stopping the game. In this case, even when the player B or the player C satisfies a clear condition of a dungeon, only the player A satisfying the clear condition at the first time may acquire the so far pooled point. In this way, it is possible to prevent the point from being overlappingly added to a plurality of players, because the points are added to the player B and the player C. In this case, all of the points consumed by the player B and the player C, or the temporarily pooled points are returned to the player B and the player C, respectively.

In the above embodiment, the case of adopting a dungeon with a predetermined clear condition as a game played by a player has been mainly described. These contents will be described by way of specific examples.

Content Example 1

An item 'Excalibur' is present in 'fort', and a content is cleared when a player obtains the item. A monster (enemy character) is present in a fort, and attacks a player character. The monster is mounted with an artificial intelligence (AI). Thus, the monster is strengthened by learning an advantageous battle progressing technique by a battle with the player character (for example, by learning which attack or magic is effective, according to the tribe or occupation of a player character). That is, based on an input such as an attack of a client, an attack pattern of the monster changes and thus a content is 'modified'. Next, a client challenging the 'fort' challenges the content in the 'modified' state.

Content Example 2

A princess is imprisoned in the deepest portion of a dungeon, and a content is cleared when a player character rescues the imprisoned princess. Since the geography of the dungeon is complex, the player should progress the game in such a way that the player character jumps over a height difference and is not melted by molten lava. In this case, a movement history of the player character is 'input', and a dungeon generation AI learns by the details of a route passed by the player character. When a next player character enters the dungeon, the shape of the dungeon is changed by the dungeon generation AI. Accordingly, searching is difficult, and the content has been 'modified'. For example, as for a route through which more player characters pass, it becomes more complicated as a result of the learning of the dungeon generation AI when a next player character challenges.

Content Example 3

In the above content example 2, a shape change of a dungeon is a movement history of a player character. However, it may be configured such that the shape of a dungeon changes based on data present on the Internet. In the data on the Internet, when the temperature of a predetermined region is below zero, a snowstorm occurs in the dungeon, thus reducing the visibility thereof. On the other hand, when a river of molten lava is frozen, the player character can go across a place that may not be gone across at normal times without a bridge. Also, when the temperature of a predetermined region is higher than 30°, an intermittent spring is generated from a rock near to molten lava, and the player character is damaged when contacting water vapor or boiling water generated from the intermittent spring. On the other hand, when the temperature is higher than 30°, because ice of an ice cave is melted, the player character can invade the ice cave. At normal times, the player character may not enter the ice cave because the player character is obstructed by the ice of the ice cave.

Content Example 4

In a dungeon, when a player character survives sequentially-attacking zombies during a predetermined period (for example, a period from sunset to daybreak), a content is cleared. When the player character fails to survive, the player character becomes a conscious zombie during some period before becoming a true zombie. In this period, the player character may modify the content by performing an input to the content (for example, leaving a recovery medicine or information about the zombie appearance place) so that a next player character can easily survive.

In the above embodiment, the difficulty level of a game is changed mainly according to the frequency of playing a game by a player, or according to whether a game is cleared by a player. However, for example, it may also be configured in such a way that the difficulty level of a game is changed according to a game play time of a player. For example, it may also be designed in such a way that a period from the open and close of a game in all the plays of the game is accumulated, and the difficulty level of the game is increased whenever the accumulated period exceeds a predetermined value.

In the above embodiment, it is configured in such a way that a player selects which game (dungeon) to play. However, according to the level, the occupation, the attribute, the action history, and the taste of a player character, a game suitable for a player may be specified in a server apparatus and introduced to the player. Also, a game played by a player may be automatically selected by a server apparatus according to the level, the occupation, the attribute, the action history, and the taste of a player character. For example, when the occupation of a player character is a white mage, before starting play of a dungeon, a dungeon that can be relatively easily explored by a white mage is introduced to a player, so that a game can be specified according to the occupation of a player character. Also, when a player frequently battles with an enemy character of a specific kind or tribe, a dungeon, which is high in the probability of appearance of the enemy character of the specific kind or tribe, is introduced to the player. Also, when a player frequently uses a specific attack or magic of a specific kind, a dungeon, which is high in the probability of appearance of an enemy character that is weak to the specific attack or magic, is introduced to the player, so that a game can be specified according to the action history of a player character operated by a player. In addition, the type of a game desired by a player may be registered in advance, and a game of the desired type may be specified in a server apparatus and introduced to the player. For example, the taste of a player with respect to a high-action game or a strategy-requiring game may be beforehand registered in a server apparatus, and a high-action game may be introduced to the player according to the taste of the player.

In the above embodiment, a plurality of mini games allowing a player character to explore a dungeon are provided, and a player selects a desired dungeon therein. However, the genres of games playable by players may also be diversified. For example, an RPG game or an action game may be played by using the same player character and consuming points, so that a game of a desired genre may be selected among games of a plurality of genres.

Also, in the above embodiment, an original game (for example, a dungeon), which can be purchased by a player character by consuming its own points, is not limited to one kind, but may be selected from a plurality of kinds. A player may purchase a game according to its own taste and grow the game according to its own taste.

In the above embodiment, the difficulty level of a game increases whenever a player closes the game (whenever ending an exploration of a dungeon). However, the difficulty level of a game may increase in real time even while a player is in the midst of playing the game. When the experience points of a dungeon increase and a predetermined experience points are acquired, even when a player is in the midst of exploring the dungeon, a dungeon progressing process may be executed. Thus, the level of an enemy character appearing in the dungeon may increase, or the frequency of an encounter with an enemy character may increase. Also, a map of a deeper layer may appear.

The difficulty level of a game does not increase in real time. However, for example, the difficulty level of a game may increase once a day, three times a week, or at a predetermined time in a predetermined day of the week. By this configuration, a player can easily detect the timing when the difficulty level of a game will increase, and can perform a play in accordance with the timing.

Also, in addition to increasing the difficulty level of a game according to the experience point or level acquired in the game, the difficulty level of the game may be increased or decreased according to the lapse of time or other parameters, in order to provide a variation or fluctuation within a predetermined range.

In addition, the difficulty level of a game may be changed in conjunction with an external server apparatus. For example, in a predetermined simple blog post site, a news site, or the like, when the ratio of the number of posts (reports) containing a specific keyword to the number of all the posts (reports) exceeds a predetermined value, the difficulty level of a game may be changed by generating an event corresponding to the specific keyword, or the like. For example, when the ratio of a keyword 'revolution' in a simple blog exceeds a predetermined value, a game that is low in the difficulty level at normal times may be increased in terms of the difficulty level, and a game that is high in the difficulty level at normal times may be decreased in terms of the difficulty level. Also, the difficulty level of a game may be increased or decreased according to parameters of a virtual world or the real world, such as stock price or weather such as clear, rainy, cloudy or the like.

In the above embodiment, a game of exploring in a dungeon when applying the present invention to an RPG has been mainly described. However, the invention is not limited thereto, and the genre is not limited if only it is a network game. Specifically, the present invention may also be applicable to an action game, a shooting game, a sports game, a race game, a fighting game, and the like.

For example, in the case of an action game or a shooting game, whenever a player clears a predetermined condition in the game, the number of obstacles in the game may be increased; the number of enemy characters appearing in the game may be increased; an enemy character appearing in the game may be strengthened; or the distance to a target point for clearing the game may be increased. That is, the difficulty level of the game may be increased whenever the player plays the game.

The present invention includes the first invention, the second invention, and the third invention. However, the first invention, the second invention, and the third invention may be executed independently. The invention may be executed in any one of a combination of the first invention and the second invention, a combination of the first invention and the third invention, a combination of the second invention and the third invention, and a combination of the first invention, the second invention, and the third invention.

REFERENCE SIGNS LIST

1 Client apparatus
11 Control section
12 RAM
13 Storage apparatus
14 Sound processing section
15 Graphic processing section
17 Communication interface
18 Interface section
19 Frame memory
21 Input section
22 Speaker
23 Display device
24 Display screen
26 Antenna
2 Communication network
3 Server apparatus
31 Control section
32 RAM
33 HDD
34 Communication interface
40 Point management table
50 Dungeon point management table
60 Dungeon management table

What is claimed is:

1. A server apparatus that is connectable to a plurality of client apparatuses by network communication, the server apparatus comprising:
a memory that stores a game program for progressing a game, the game program for progressing the game not being stored in the plurality of client apparatuses;
a game progress controller that controls a progress of the game according to the game program when receiving a game open request from one of the plurality of client apparatuses, the plurality of client apparatuses being operated by players, the game open request being received from the one of the plurality of client apparatuses via a network, the game configured to be executed by the plurality of client apparatuses in a same time period; and
an interface for transmitting data of the progress of the game from the server to the one of the plurality of client apparatuses via the network when the game open request is received from the one of the plurality of client apparatuses,
wherein the game progress controller controls the progress of the game by changing a difficulty level of the game for all of the plurality of client apparatuses according to a number of times of playing the game or an accumulated play time of the game by the players operating the plurality of client apparatuses,
as the number of times of playing the game increases or the accumulated play time of the game increases, the difficulty level of the game becomes higher,
when plural client apparatuses from among the plurality of client apparatuses execute the game in the same time period, the game is separately progressed by the server apparatus for each of the plural client apparatuses, and
when a first client apparatus of the plural client apparatuses causes the difficulty level of the game to become higher, the difficulty level of the game for a second client apparatus of the plural client apparatuses which executes the game during the same time period as the first client apparatus does not change in real time.

2. The server apparatus according to claim 1, further comprising:
an amenity storage that stores an amenity that is given to one of the players which progresses the game;
a condition determiner that determines whether the game progressed by the game progress controller satisfies a predetermined condition;
an amenity reserver that reserves an accumulated amenity by adding the amenity stored in the amenity storage, when the condition determiner determines that the predetermined condition is not satisfied; and
an amenity adder that gives an award amenity stored in the amenity storage to the one of the players, when the condition determiner determines that the predetermined condition is satisfied.

3. The server apparatus according to claim 1, further comprising:
an amenity storage that stores an amenity that is given to one of the players which progresses the game;
a condition determiner that determines whether the game progressed by the game progress controller satisfies a predetermined condition; and an amenity adder that gives an award amenity stored in the amenity storage to the one of the players, when the condition determiner determines that the predetermined condition is satisfied, wherein the amenity adder increases the award amenity that is given to the one of the players, as the number of times of playing the game increases.

4. The server apparatus according to claim 1, further comprising:

a retention point storage that stores retained points accumulated by the players operating the plurality of client apparatuses;

wherein the game open request consumes a predetermined number of the retained points accumulated by a corresponding one of the players and stored in the retention point storage.

5. The server apparatus according to claim 4, further comprising:

a temporary point storage that stores consumed points consumed by the players during the progress of the game, wherein at least a portion of the predetermined number of the retained points are transferred from the retention point storage to the temporary point storage when the game progress controller receives the game open request, and the consumed points are transferred from the temporary point storage to the retention point storage in response to a predetermined condition being satisfied by the players during the progress of the game.

6. The server apparatus according to claim 5, further comprising:

a pool point storage that stores pooled points of a plurality of characters, the pooled points accumulating when any of the plurality of characters fails to satisfy the predetermined condition during the progress of the game, wherein the pooled points are transferred from the pool point storage to the retention point storage in response to the predetermined condition being satisfied by the players during the progress of the game, and the consumed points are transferred from the temporary point storage to the pool point storage when the players fail to satisfy the predetermined condition during the progress of the game.

7. The server apparatus according to claim 6, wherein an item associated with the predetermined condition in the game is configured to be purchased by the players with the retained points accumulated by the players.

8. The server apparatus according to claim 7, wherein a total number of the pooled points stored in the pool point storage is available to only the players owning the item associated with the predetermined condition.

9. The server apparatus according to claim 7, wherein a portion of the pooled points stored in the pool point storage are transferred to the retention point storage in response to each of the players owning the item associated with the predetermined condition.

10. The server apparatus according to claim 7, wherein an ownership period of the item associated with the predetermined condition is variable, and a purchase price of the item increases in accordance with the ownership period.

11. The server apparatus according to claim 10, wherein a portion of the predetermined number of the retained points is lost when being transferred from the retention point storage to the temporary point storage when the game progress controller receives the game open request.

12. The server apparatus according to claim 11, further comprising:

a currency converter that converts the retained points accumulated by the players operating the plurality of client apparatuses into money in the real world.

13. The server apparatus according to claim 5, wherein wherein progressing the game by the plurality of client apparatuses consumes additional points of the retained points accumulated by the players and stored in the retention point storage, and at least a portion of the additional points is transferred from the retention point storage to the temporary point storage during the progress of the game.

14. The server apparatus according to claim 4, wherein the predetermined number of the retained points consumed by the game open request increases in accordance with the difficulty level of the game.

15. The server apparatus according to claim 1, wherein the game progress controller changes the difficulty level of the game by varying a depth of a map of the game.

16. The server apparatus according to claim 1, wherein the game progress controller changes the difficulty level of the game further according to a lapse of time.

17. The server apparatus according to claim 1, further comprising:

a memory that stores the difficulty level of the game;

a clock that measures time;

wherein the difficulty level of the game increases whenever any of the plurality of client apparatuses closes the game, the difficulty level of the game further increases during the progress of the game in accordance with the accumulated play time of the game, and the game progress controller changes the difficulty level of the game in accordance with the difficulty level stored in the memory every predetermined period of time measured by the clock, and does not change the difficulty level of the game in real time.

18. A non-transitory computer-readable medium that stores a program for causing a client apparatus which is connectable to a server apparatus by network communication to function as:

a communication interface that transmits a game open request to the server apparatus via a network;

wherein the server apparatus comprises:

a memory that stores a game program for progressing a game, the game program for progressing the game not being stored in the client apparatus;

a game progress controller that controls a progress of the game according to the game program when receiving the game open request from the client apparatus, the game configured to be executed by a plurality of client apparatuses in a same time period, the plurality of client apparatuses being operated by players; and an interface for transmitting data of the progress of the game from the server to the client apparatus via the network when the game open request is received from the client apparatus, the game progress controller controls the progress of the game by changing a difficulty level of the game for all of the plurality of client apparatuses according to a number of times of playing the game or an accumulated play time of the game by the players operating the plurality of client apparatuses, as the number of times of playing the game increases or the accumulated play time of the game increases, the difficulty level of the game becomes higher, when plural client apparatuses from among the plurality of client apparatuses execute the game in the same time period, the game is separately progressed by the server apparatus for each of the plural client apparatuses, and when a first client apparatus of the plural client apparatuses causes the difficulty level of the game to become higher, the difficulty level of the game for a second client apparatus of the plural client apparatuses which executes the game during the same time period as the first client apparatus does not change in real time.

19. A non-transitory computer-readable medium that stores a program for causing a server apparatus which is connectable to a plurality of client apparatuses by network communication, to function as:

a memory that stores a game program for progressing a game, the game program for progressing the game not being stored in the plurality of client apparatuses;

a game progress controller that controls a progress of the game according to the game program when receiving a game open request from one of the plurality of client apparatuses via a network, the plurality of client apparatuses being operated by players, the game configured to be executed by the plurality of client apparatuses in a same time period; and an interface for transmitting data of the progress of the game from the server to the one of the plurality of client apparatuses via the network when the game open request is received from the one of the plurality of client apparatuses, wherein the game progress controller controls the progress of the game by changing a difficulty level of the game for all of the plurality of client apparatuses according to a number of times of playing the game or an accumulated play time of the game by the players operating the plurality of client apparatuses, as the number of times of playing the game increases or the accumulated play time of the game increases, the difficulty level of the game becomes higher, when plural client apparatuses from among the plurality of client apparatuses execute the game in the same time period, the game is separately progressed by the server apparatus for each of the plural client apparatuses, and when a first client apparatus of the plural client apparatuses causes the difficulty level of the game to become higher, the difficulty level of the game for a second client apparatus of the plural client apparatuses which executes the game during the same time period as the first client apparatus does not change in real time.

20. A game system that is connectable between a plurality of client apparatuses and a server apparatus by network communication, the game system comprising:

a memory that stores a game program for progressing a game, the game program for progressing the game not being stored in the plurality of client apparatuses;

a game progress controller that controls a progress of the game according to the game program, the game configured to be executed by the plurality of client apparatuses in a same time period, the plurality of client apparatuses being operated by players; and an interface for transmitting data of the progress of the game from the server to the one of the plurality of client apparatuses via a network when the game open request is received from the one of the plurality of client apparatuses, wherein each of the plurality of client apparatuses comprises a communication interface that transmits a game open request to the server apparatus via the network when receiving a game open request from a corresponding one of the players, the game progress controller controls the progress of the game in each of the plurality of client apparatuses when the server apparatus receives the game open request, by changing a difficulty level of the game for all of the plurality of client apparatuses according to a number of times of playing the game or an accumulated play time of the game by the players operating the plurality of client apparatuses, as the number of times of playing the game increases or the accumulated play time of the game increases, the difficulty level of the game becomes higher, when plural client apparatuses from among the plurality of client apparatuses execute the game in the same time period, the game is separately progressed by the server apparatus for each of the plural client apparatuses, and when a first client apparatus of the plural client apparatuses causes the difficulty level of the game to become higher, the difficulty level of the game for a second client apparatus of the plural client apparatuses which executes the game during the same time period as the first client apparatus does not change in real time.

* * * * *

UNITED STATES PATENT AND TRADEMARK OFFICE
CERTIFICATE OF CORRECTION

| | |
|---|---|
| PATENT NO. | : 9,649,568 B2 |
| APPLICATION NO. | : 13/483374 |
| DATED | : May 16, 2017 |
| INVENTOR(S) | : Y. Wada |

Page 1 of 1

It is certified that error appears in the above-identified patent and that said Letters Patent is hereby corrected as shown below:

On the Title Page

Other Publications, page 2, Column 2, Line 2, please change "the Interent" to --the Internet--

In the Claims

Column 20, Line 9 (Claim 13, Lines 1-2) please change "wherein wherein progressing" to --wherein progressing--

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*